June 9, 1936. K. BERGK ET AL 2,043,422
DIATHERMIC APPARATUS FOR GENERATING SHORT OR ULTRA SHORT WAVES
Filed May 17, 1933   2 Sheets-Sheet 1

Inventors:
Kurt Bergk
Josef Hofmann
By Edward H. Palmer
Atty.

June 9, 1936.    K. BERGK ET AL    2,043,422
DIATHERMIC APPARATUS FOR GENERATING SHORT OR ULTRA SHORT WAVES
Filed May 17, 1933    2 Sheets-Sheet 2

Inventors:
Kurt Bergk
Josef Hofmann
by Edward H. Palmer
atty.

Patented June 9, 1936

2,043,422

UNITED STATES PATENT OFFICE 2,043,422

DIATHERMIC APPARATUS FOR GENERATING SHORT OR ULTRA-SHORT WAVES

Kurt Bergk, Berlin-Tempelhof, and Josef Hofmann, Berlin-Reinickendorf-Ost, Germany, assignors to Elektricitätsgesellschaft "Sanitas" m. b. H., Berlin, Germany, a corporation of Germany Application May 17, 1933, Serial No. 671,525
In Germany October 20, 1932

14 Claims. (Cl. 128—420)

This invention relates to diathermic apparatus for generating short or ultra short waves in which the oscillations are produced by a spark-gap, preferably a series spark-gap.

One of the objects of the invention is to provide apparatus of the class described which, while generating as short a wave as possible, that is to say with the capacity and self-induction of the primary oscillatory circuit reduced as much as possible, shall possess the efficiency required for diathermic purposes.

To accomplish this result there are certain difficulties to be overcome. For example, reduction of the capacity entails a corresponding reduction of the efficiency of the apparatus. This loss can only be remedied by increasing the tension of the condenser and consequently the sparking voltage of the spark gap, preferably by increasing the number of the spark gaps. This, however, is objectionable as it entails an increase in the self-induction, that is to say in the wave length.

Furthermore, decreasing the capacity carries with it the danger of arcing at the spark gap. It is true that in long wave diathermy it has been proposed to secure uniform operation of the spark-gap by providing a capacity, that is to say an auxiliary circuit comprising a capacity and a self-induction parallel to the spark-gap. The use of such an expedient, however, in short wave diathermic apparatus will not secure the desired result as the greater part of the energy flows through said auxiliary circuit and the efficiency of the apparatus is practically nil.

The present invention overcomes these difficulties by connecting the two armatures of the condenser in the primary oscillatory circuit directly and in the shortest way possible to the spark-gap, herein a series spark-gap of preferably circular shape, and further by making the self-induction of an auxiliary circuit, comprising also a capacity and disposed in parallel to said spark-gap, as large as possible, yet not so large as to deprive said capacity of its quenching capacity. An apparatus of sufficiently great efficiency for diathermic purposes will thus be obtained, in spite of the reduction of the capacity, that is to say the wave length, by increasing the number of the spark-gaps and the voltage of the condenser of the primary oscillatory circuit, while avoiding any particular self-induction, particularly any caused by supply conductors, and any losses of short wave energy by the quenching capacity.

Another object of the invention is to provide apparatus of the class described wherein the capacity of the energizing circuit is eliminated, so that the capacity of the treating circuit constitutes the capacity of the energizing circuit which in conjunction with the self-induction of the spark gap determines the wave length. Other objects of the invention will appear from the following description.

The invention and its aims and objects will be readily understood from the following description taken in connection with the accompanying drawings of illustrative apparatus embodying the features of the invention, the true scope of the invention being more particularly pointed out in the appended claims.

Figures 1, 4:
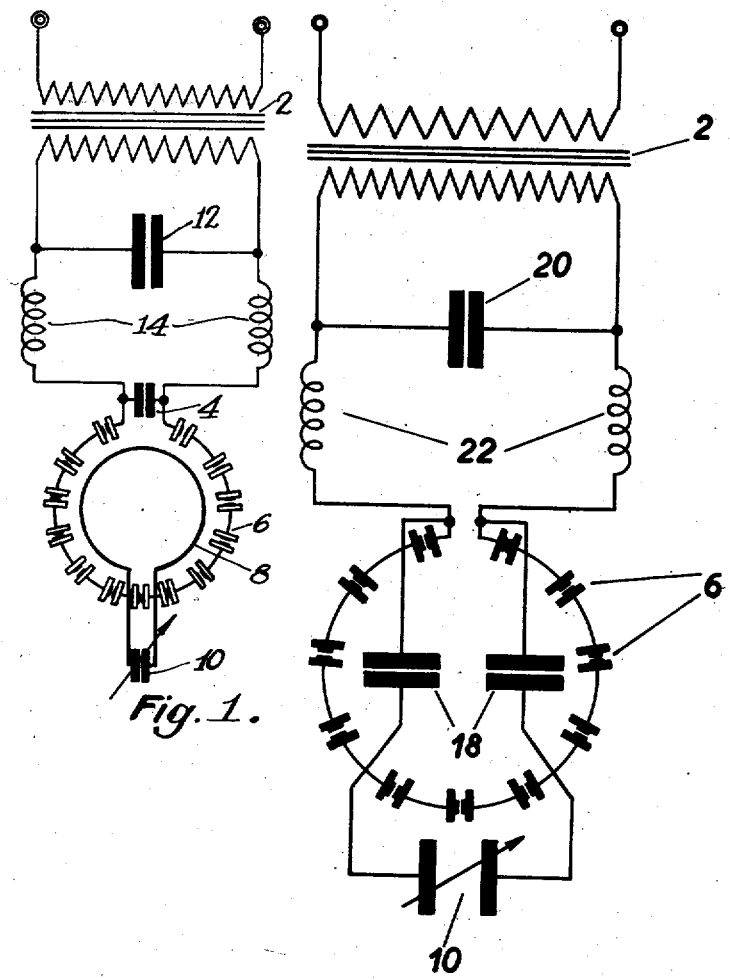
Fig. 1 is a diagrammatic representation of apparatus embodying certain features of the invention.
Fig. 4 illustrates diagrammatically a construction similar to that of Fig. 3 but comprising an auxiliary circuit including a self-induction and so-called quenching capacity to prevent arcing at the spark gap.

Referring to Fig. 1, a transformer is shown at 2 which serves to charge a condenser 4 in the primary oscillatory circuit. The condenser 4 discharges over a spark-gap, herein a series spark-gap 6 having its two terminals directly connected to the two armatures respectively of said condenser, that is to say said connection is made without the interposition of any conductor. Said series spark-gap 6 may be of any suitable shape. Herein said series spark-gap constitutes one element of a coupling, as shown an inductive coupling, the other element of which, herein in the form of a convolution 8, forms with a treating capacity 10 the secondary oscillatory circuit. Said series spark-gap is therefore herein also conveniently made in the form of a convolution. In order to secure the uniform operation of the spark-gap, an auxiliary circuit, parallel to said spark-gap and comprising a capacity 12 and self-induction 14 is provided. In accordance with the invention said self-induction 14 will be so large that the current flowing through said auxiliary circuit will be as small as possible and yet sufficient to retain the quenching capacity of the capacity 12. By dividing said self-induction 14 between the two conductors connecting the transformer with the spark-gap, said self-induction also functions as a means of preventing or cutting off the escape or flow of the short waves to earth.

Figures 2, 3:
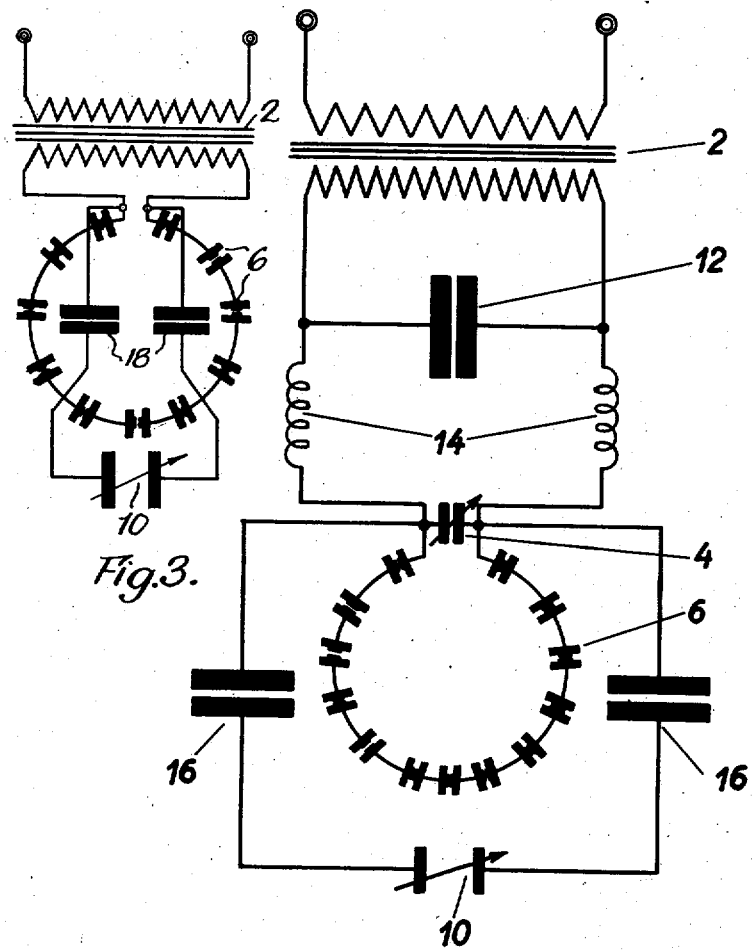
Fig. 2 shows diagrammatically a construction similar to that of Fig. 1, but in which the treating capacity is directly (galvanically) connected to the primary oscillatory circuit, instead of inductively, protective capacities being inserted to guard against low frequency tension.
Fig. 3 is a diagrammatic representation of apparatus embodying certain features of the invention, in which the exciting circuit capacity is omitted.

As illustrated in Fig. 2, said treating capacity 10 may be non-inductively, that is to say, directly or galvanically connected with the primary oscillatory circuit, protective means, such as protective capacities 16, being inserted in the circuit to guard against low frequency tension.

Referring to Fig. 3, it will be seen that therein the capacity 4 of the energizing circuit is eliminated. A transformer 2 delivers the necessary high tension for the series spark-gap 6. The energizing circuit comprises said series spark-gap and the treating capacity 10, said energizing circuit with its supply conductors also forming the treating circuit. In the illustrative embodiment of the invention said series spark-gap is shown as substantially circular but it will be apparent that it may be of any suitable shape. Condensers 16 protect the patient from low frequency tension, said condensers being small enough to prevent passage of low frequency currents but large enough to be without effect upon the length of the short waves.

Referring to Fig. 4, wherein the capacity for the energizing circuit is also eliminated, it will be seen that an auxiliary circuit comprising a self-induction 22 and a so-called quenching capacity 20 is provided parallel to the spark-gap 6, whereby sparking at the spark-gap is prevented. Said self-induction 22 is divided between the two conductors connecting said spark gap with the transformer 2, said self-induction, thus also functioning as means for preventing or cutting off the escape or flow of the short waves to earth. As in Fig. 3 condensers 16 protect the patient from low frequency tension. The treating capacity is shown at 10.

As will be readily understood by those skilled in the art, means, such as high frequency choking means or the like will be used both in Figures 3 and 4 to protect the transformer against high frequency oscillations. These may be of any suitable and conventional type and it is therefore believed unnecessary to describe and show them, more particularly as to show them would needlessly encumber the drawings.

We are aware that our invention may be embodied in other specific forms without departing from its spirit or essential attributes thereof, and we therefore desire the present embodiment to be considered in all respects as illustrative and not restrictive, reference being had to the appended claims rather than to the foregoing description to indicate the scope of the invention.

We claim:

1. An apparatus of the class described comprising, in combination, a primary oscillatory circuit; a condenser in said circuit; a series spark-gap; an auxiliary circuit comprising a capacity and self induction, and disposed parallel to said spark-gap, the ends of said spark-gap being directly connected to the two poles respectively of said condenser, and said self-induction being as large as it is possible for it to be without depriving said capacity of its quenching capacity to prevent arcing at the spark-gap.

2. Apparatus of the class described comprising, in combination, a primary oscillatory circuit; a secondary oscillatory circuit; a condenser in said primary oscillatory circuit; a series of spark-gap; an auxiliary circuit comprising a capacity and self-induction and disposed parallel to said spark-gap, said spark-gap forming one element of a coupling for said primary and secondary oscillatory circuits and having its ends directly connected to the two poles respectively of said condenser, said self-induction being as large as it is possible for it to be without depriving said capacity of its quenching capacity to prevent arcing at said spark-gap.

3. Apparatus of the class described comprising, in combination, a primary oscillatory circuit; a condenser in said circuit; a series spark-gap; an auxiliary circuit comprising a capacity and self-induction, and disposed parallel to said spark-gap, the ends of said spark-gap being directly connected to the two poles respectively of said condenser, and said self induction being as large as possible without depriving said capacity of its quenching capacity to prevent arcing at the spark-gap and being so disposed as also to constitute means to prevent escape or flowing of the rapid oscillations to earth.

4. Apparatus of the class described comprising, in combination, a primary oscillatory circuit; a condenser in said circuit; a series spark-gap having its ends directly connected to the two poles respectively of said condenser; a transformer to charge said condenser; an auxiliary circuit comprising a capacity and self-induction, said self-induction comprising two coils inserted in the conductors connecting said spark-gap and transformer and being as large as possible without depriving said capacity of its quenching capacity to prevent arcing at the spark-gap, said auxiliary circuit being disposed parallel to said spark-gap.

5. Apparatus of the class described comprising, in combination, a primary oscillatory circuit; condenser plates galvanically connected to said circuit; a condenser in said circuit; a series spark-gap; an auxiliary circuit comprising a capacity and self-induction, and disposed parallel to said spark-gap, the ends of said spark-gap being directly connected to the two poles respectively of said condenser, and said self-induction being as large as possible without depriving the capacity said auxiliary circuit of its quenching capacity to prevent arcing at the spark-gap.

6. Apparatus of the class described comprising, in combination, an exciting circuit including a condenser and a series spark-gap, said spark-gap being directly connected to the poles of said condenser; a self-induction for said spark-gap; a treating circuit connected to said exciting circuit and comprising a capacity, said last-named capacity, also forming in conjunction with the self-induction of said spark-gap, the capacity which determines the wave length of said exciting circuit.

7. Apparatus of the class described comprising, in combination, an exciting circuit including a condenser and a series spark-gap connected directly to the poles of said condenser; an auxiliary circuit parallel to said spark-gap and comprising a capacity and self-induction; a treating circuit connected to said exciting circuit and comprising a treating capacity, said last-named capacity, also forming, in conjunction with said self-induction, the capacity which determines the wave length of said exciting circuit, said self-induction of said auxiliary circuit being as large as possible without depriving said capacity of its quenching capacity to prevent arcing at the spark-gap.

8. Apparatus of the class described comprising, in combination, a primary oscillatory circuit; a treating capacity galvanically connected to said circuit; a condenser in said circuit; a series spark-gap; an auxiliary circuit comprising a capacity and self-induction; protective means to guard against low frequency tension; said auxiliary circuit being disposed parallel to said spark-gap and the ends of the latter being directly connected to the two poles respectively of said condenser, said self-induction being as large as possible without depriving the capacity in said auxiliary circuit of its quenching capacity to prevent arcing at the spark-gap.

9. Apparatus of the class described comprising, in combination, a primary oscillatory circuit; a condenser in said circuit; a treating capacity galvanically connected to said primary oscillatory circuit; and a spark-gap having its two ends directly connected to the two poles respectively of said condenser.

10. Apparatus of the class described comprising, in combination, a substantially circular series spark-gap; a quenching circuit therefor; a coupling including said spark-gap as its primary and an inductive coupling element as its secondary.

11. Apparatus of the class described comprising, in combination, a primary oscillatory circuit including a condenser; a series spark gap having its ends connected to the two poles respectively of said condenser; and a coupling including said spark gap as its primary and an inductive coupling element as its secondary.

12. Apparatus of the class described comprising, in combination, a primary oscillatory circuit including a condenser; a substantially circular series spark gap having its ends connected to the two poles respectively of said condenser; and a coupling including said spark gap as its primary and a substantially circular inductive coupling element as its secondary.

13. Apparatus of the class described comprising, in combination, a primary oscillatory circuit including a condenser; a series spark gap having its ends connected to the two poles respectively of said condenser; a treating circuit galvanically connected to said oscillatory circuit; and means in said treating circuit to guard against low frequency tension.

14. Apparatus of the class described comprising, in combination, a primary oscillatory circuit including a condenser; a series spark gap having its ends connected to the two poles respectively of said condenser; a treating circuit galvanically connected to said oscillatory circuit; and protective condenser means in said treating circuit to guard against low frequency tension.

KURT BERGK.
JOSEF HOFMANN.

CERTIFICATE OF CORRECTION.

Patent No. 2,043,422.                                        June 9, 1936.

KURT BERGK, ET AL.

It is hereby certified that error appears in the printed specification of the above numbered patent requiring correction as follows: Page 2, second column, line 47, claim 5, after the word "capacity" insert in; and that th said Letters Patent should be read with this correction therein that the same may conform to the record of the case in the Patent Office.

Signed and sealed this 8th day of September, A. D. 1936.

(Seal)

Leslie Frazer
Acting Commissioner of Patents.

8. Apparatus of the class described comprising, in combination, a primary oscillatory circuit; a treating capacity galvanically connected to said circuit; a condenser in said circuit; a series spark-gap; an auxiliary circuit comprising a capacity and self-induction; protective means to guard against low frequency tension; said auxiliary circuit being disposed parallel to said spark-gap and the ends of the latter being directly connected to the two poles respectively of said condenser, said self-induction being as large as possible without depriving the capacity in said auxiliary circuit of its quenching capacity to prevent arcing at the spark-gap.

9. Apparatus of the class described comprising, in combination, a primary oscillatory circuit; a condenser in said circuit; a treating capacity galvanically connected to said primary oscillatory circuit; and a spark-gap having its two ends directly connected to the two poles respectively of said condenser.

10. Apparatus of the class described comprising, in combination, a substantially circular series spark-gap; a quenching circuit therefor; a coupling including said spark-gap as its primary and an inductive coupling element as its secondary.

11. Apparatus of the class described comprising, in combination, a primary oscillatory circuit including a condenser; a series spark gap having its ends connected to the two poles respectively of said condenser; and a coupling including said spark gap as its primary and an inductive coupling element as its secondary.

12. Apparatus of the class described comprising, in combination, a primary oscillatory circuit including a condenser; a substantially circular series spark gap having its ends connected to the two poles respectively of said condenser; and a coupling including said spark gap as its primary and a substantially circular inductive coupling element as its secondary.

13. Apparatus of the class described comprising, in combination, a primary oscillatory circuit including a condenser; a series spark gap having its ends connected to the two poles respectively of said condenser; a treating circuit galvanically connected to said oscillatory circuit; and means in said treating circuit to guard against low frequency tension.

14. Apparatus of the class described comprising, in combination, a primary oscillatory circuit including a condenser; a series spark gap having its ends connected to the two poles respectively of said condenser; a treating circuit galvanically connected to said oscillatory circuit; and protective condenser means in said treating circuit to guard against low frequency tension.

KURT BERGK.
JOSEF HOFMANN.

CERTIFICATE OF CORRECTION.

Patent No. 2,043,422.   June 9, 1936.

KURT BERGK, ET AL.

It is hereby certified that error appears in the printed specification of the above numbered patent requiring correction as follows: Page 2, second column, line 47, claim 5, after the word "capacity" insert in; and that th said Letters Patent should be read with this correction therein that the same may conform to the record of the case in the Patent Office.

Signed and sealed this 8th day of September, A. D. 1936.

(Seal)

Leslie Frazer
Acting Commissioner of Patents.

CERTIFICATE OF CORRECTION.

Patent No. 2,043,422. June 9, 1936.

KURT BERGK, ET AL.

It is hereby certified that error appears in the printed specification of the above numbered patent requiring correction as follows: Page 2, second column, line 47, claim 5, after the word "capacity" insert in; and that th said Letters Patent should be read with this correction therein that the same may conform to the record of the case in the Patent Office.

Signed and sealed this 8th day of September. A. D. 1936.

(Seal)

Leslie Frazer
Acting Commissioner of Patents.